May 2, 1950 J. J. SENDOYKAS 2,506,241
MECHANICAL MOVEMENT
Filed Jan. 16, 1946 4 Sheets-Sheet 2
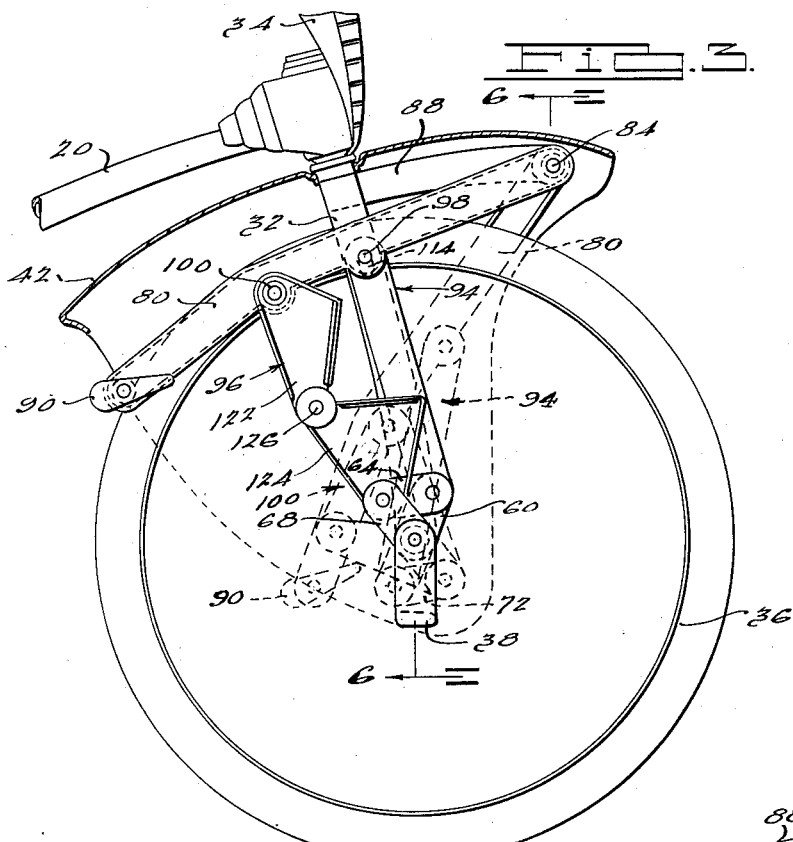
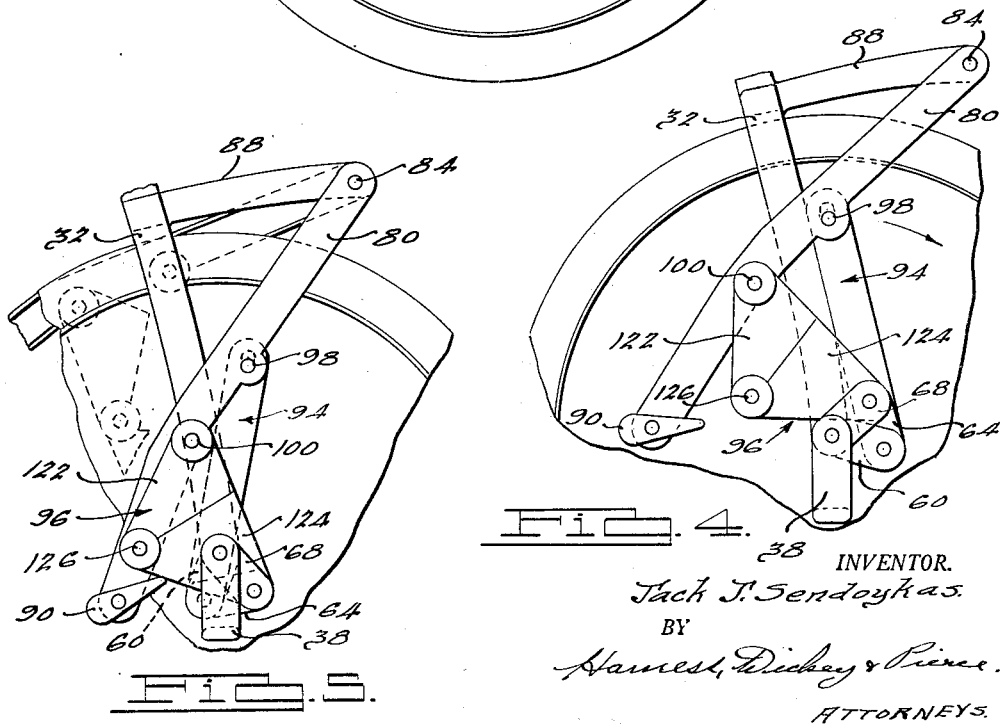
INVENTOR.
Jack J. Sendoykas.
BY
Harness, Dickey & Pierce.
ATTORNEYS.

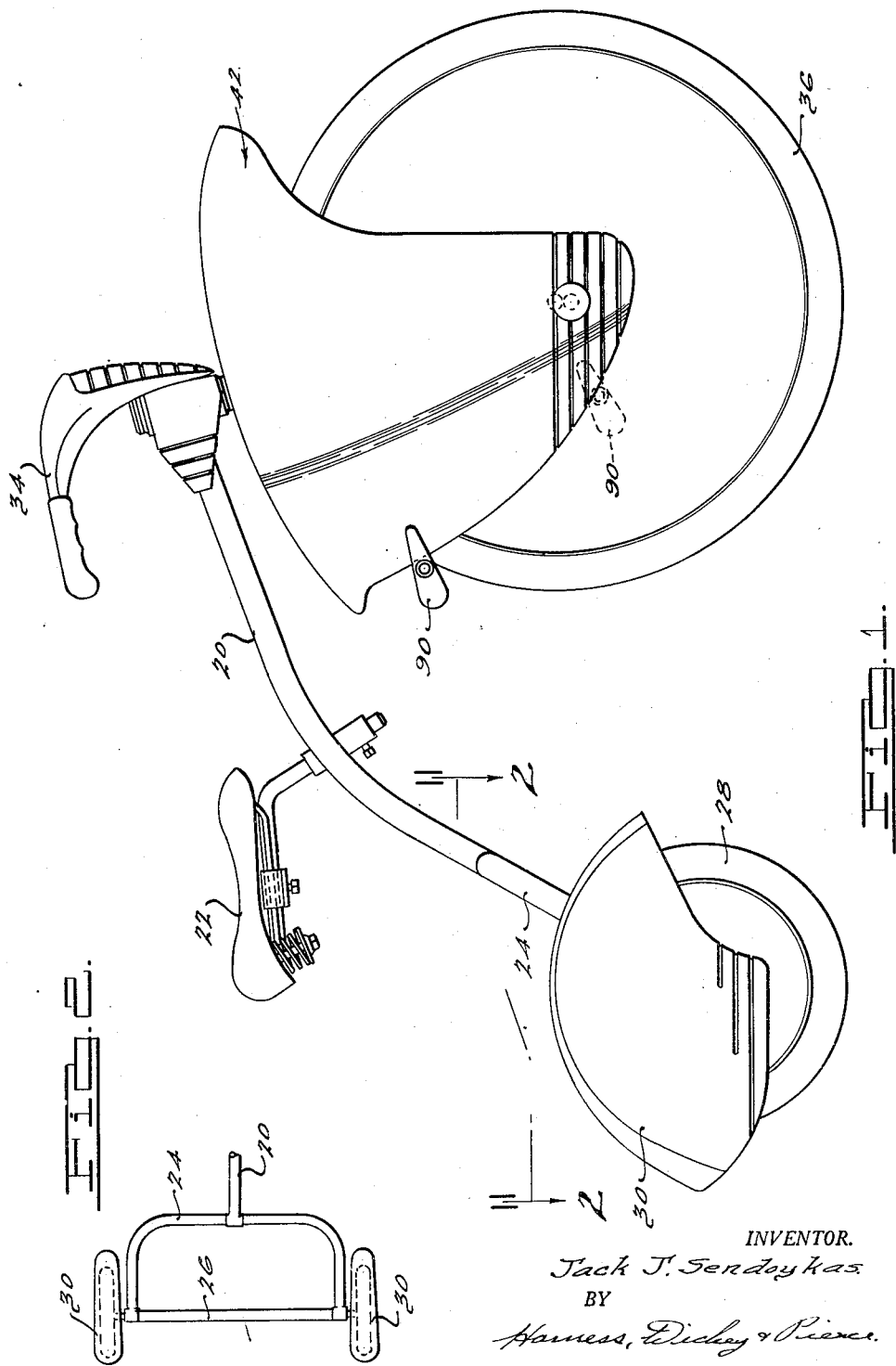

May 2, 1950 J. J. SENDOYKAS 2,506,241
MECHANICAL MOVEMENT
Filed Jan. 16, 1946 4 Sheets-Sheet 3
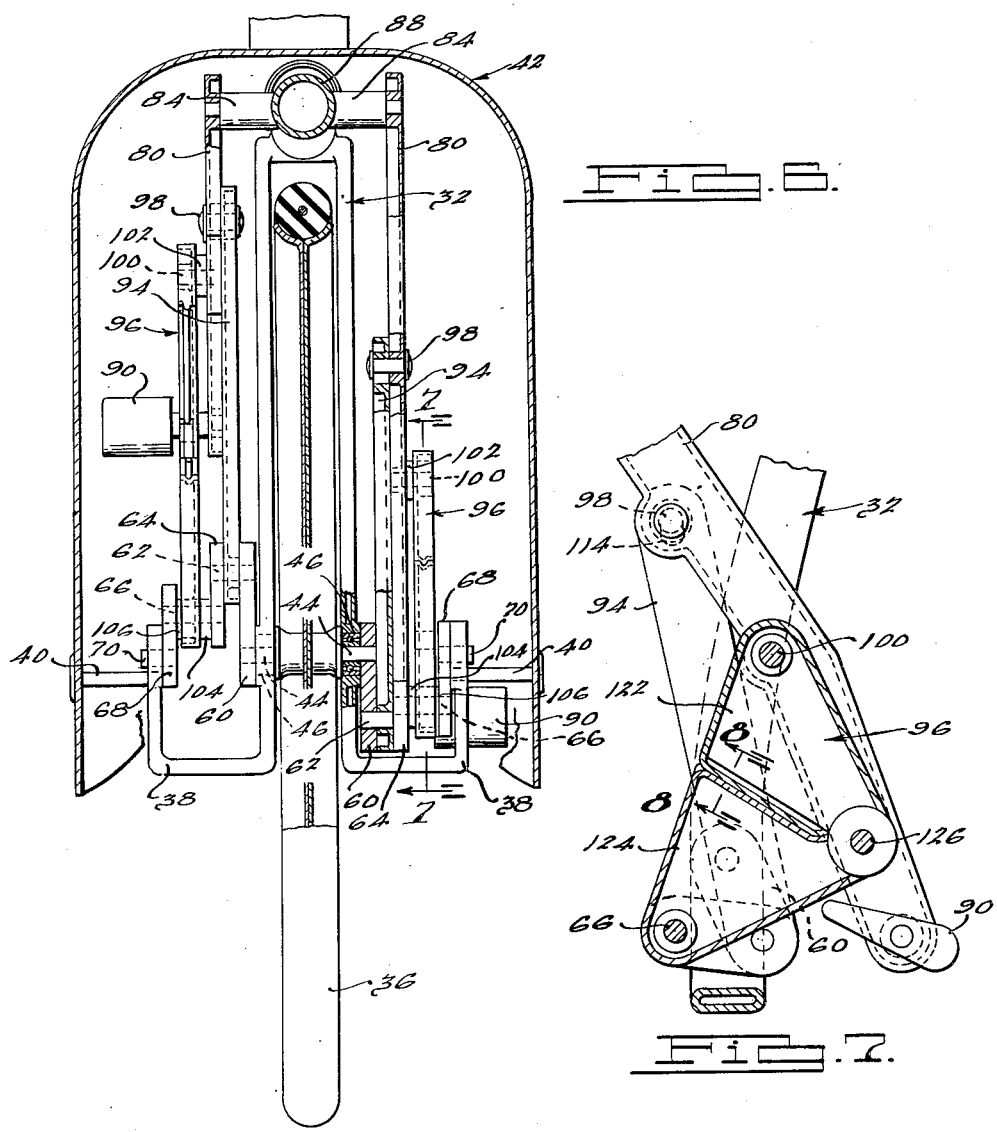
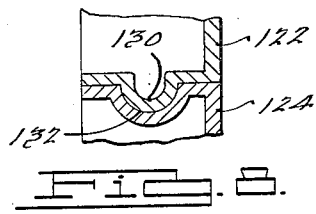
INVENTOR.
Jack J. Sendoykas.
BY
Harness, Dickey & Pierce.
ATTORNEYS.

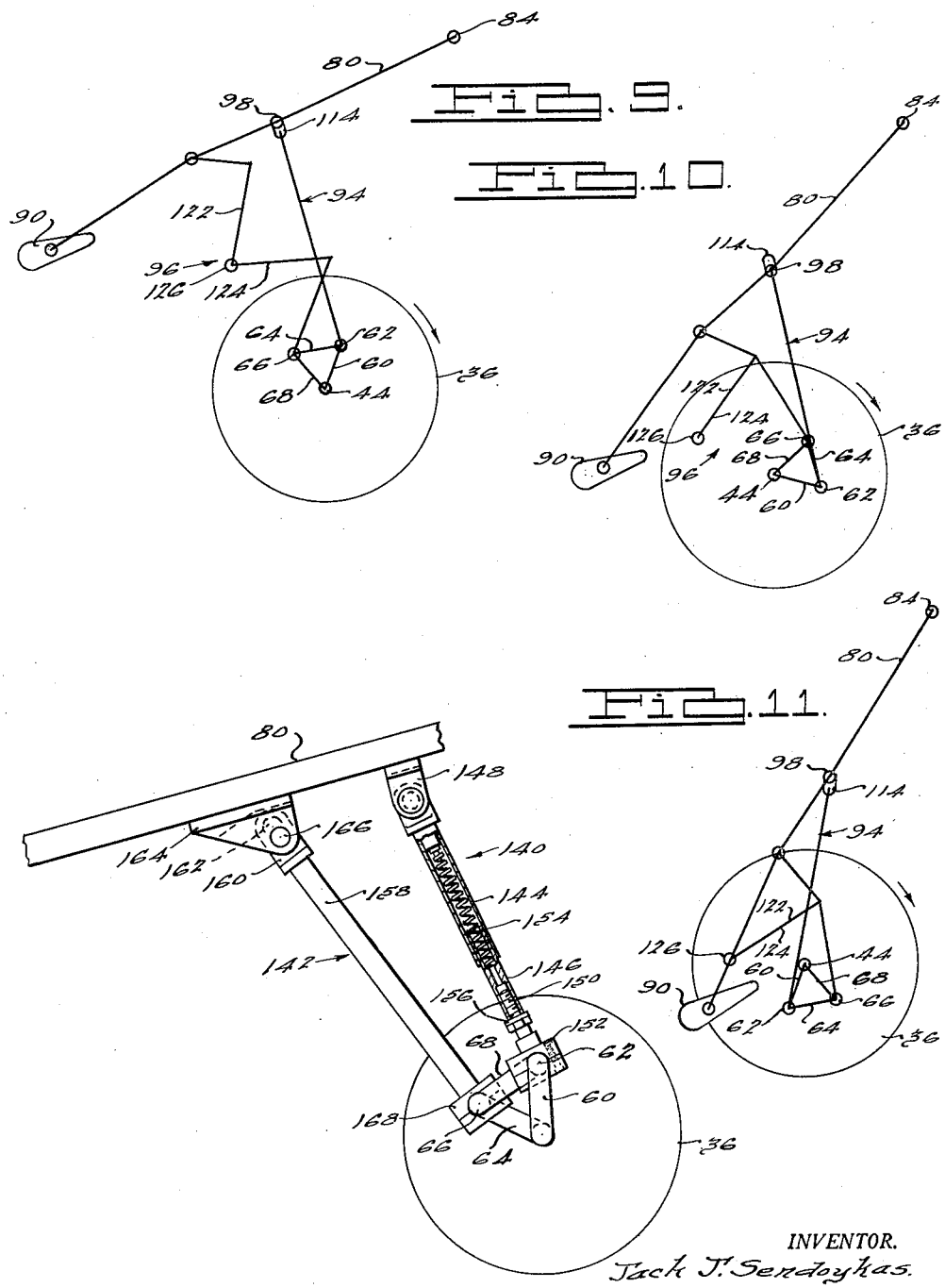

Patented May 2, 1950

2,506,241

UNITED STATES PATENT OFFICE 2,506,241

MECHANICAL MOVEMENT

Jack J. Sendoykas, Detroit, Mich., assignor to
Constance Karries Sendoykas, Detroit, Mich.

Application January 16, 1946, Serial No. 641,459

15 Claims. (Cl. 74—36)

1

This invention relates broadly to mechanisms for transmitting thrust from a pair of reciprocating, or approximately reciprocating, driving members to a crankshaft in such manner that possibility of the latter stalling or stopping on dead center is obviated.

In any mechanism where rotative motion is transmitted through the medium of a crankshaft driven by only two members having a relatively reciprocatory or oscillatory movement, difficulty arises due to a tendency of the crankshaft to stall or stop in a dead-center position; i. e., the position occupied by the cranks when they move into alignment with the driving force. This phenomenon occurs twice during each revolution of a conventional double-throw crankshaft and presents a real problem to the art.

A typical example of such a mechanism is found in the conventional velocipede which has a power or traction wheel fixed on a double-throw crankshaft. The cranks are arranged in diametrically opposed relation on opposite sides of the wheel and are driven by the two feet and legs of the operator through a pair of conventional foot pedals. When the vehicle is being pedaled uphill, or under circumstances where the forces opposing movement are relatively great and its speed is relatively slow, the condition above referred to is particularly pronounced. Considerable leverage can be applied by the feet of the operator against the cranks, except when the latter occupy a dead-center position, at which time the momentum of the vehicle must be relied upon for continued movement. Obviously, the tendency for the vehicle to stall or stop at this time is great.

The principal object of the present invention is to provide mechanism, including a crankshaft, for operatively connecting a pair of relatively reciprocable or oscillatable driven members to a rotating part to effect rotation of the latter, and in which mechanism no dead-center position exists.

Another object of the invention is to provide a mechanism of the above-mentioned character in which the cranks are forcefully moved a substantial distance past the dead-center positions by the driven members so that efficient operation can be obtained by alternate application of force through the two driven members to the cranks.

Another object of the invention is the provision of a crank mechanism of the type described in which the rods or links which transmit the power from the two driven members to the crankshaft transmit such power solely through compressive forces in such rods or links.

2

Still another object of the invention is to provide a mechanism of the above-mentioned character that can be used in any capacity where power is transmitted through the medium of a pair of relatively reciprocable or oscillatable driven members to a crankshaft.

Yet another object of the invention is to provide a mechanism of the above-mentioned character that is pre-eminently suited for use on a child's velocipede and, when applied in this capacity, produces such a vehicle of new and novel construction which is much easier to operate than conventional velocipedes.

A further object of the invention is to provide a mechanism of the above-mentioned character that greatly increases the mechanical efficiency of any device in which it is used.

A still further object of the invention is to provide a mechanism of the above-mentioned character that is simple yet strong and rugged in construction and highly efficient in operation.

Other objects and advantages of the invention will be apparent during the course of the following description.

In the drawings forming a part of this specification and wherein like numerals are employed to designate like parts throughout the same, Fig. 1 is a side elevation of a child's velocipede having a mechanism embodying the instant invention incorporated therewith;

Fig. 2 is a fragmentary, horizontal sectional view taken on the line 2—2 of Fig. 1;

Fig. 3 is a fragmentary view of the front portion of the velocipede, parts of the vehicle being broken away and shown in section for clearness of illustration and showing the mechanism when one pedal is fully lowered and the other is fully raised;

Fig. 4 is a fragmentary view similar to Fig. 3, but showing the mechanism when the pedals are in an intermediate position;

Fig. 5 is a fragmentary view similar to Fig. 3, but showing the mechanism when the pedals are in reverse position;

Fig. 6 is a fragmentary, vertical sectional view taken on the line 6—6 of Fig. 3;

Fig. 7 is a fragmentary, vertical sectional view taken on the line 7—7 of Fig. 6;

Fig. 8 is a fragmentary, vertical sectional view taken on the line 8—8 of Fig. 7;

Fig. 9 is a diagrammatic view which illustrates the mechanism when positioned as shown in Fig. 3;

Fig. 10 is a diagrammatic view which illustrates the mechanism when positioned as shown in Fig. 4;

Fig. 11 is a diagrammatic view illustrating the mechanism when positioned as shown in Fig. 5; and Fig. 12 is a fragmentary side view showing a modified form of the mechanism, parts thereof being shown in elevation and parts in section for clearance of illustration.

Considered in certain of its broader aspects, the mechanism embodying the instant invention comprises a crankshaft in which each end or half of the crankshaft has a pair of relatively fixed, angularly related axially inner and outer crankpins, a driving member for each half or end of the crankshaft, and a pair of compression or rod members, one connecting each crankpin on each end of the crankshaft with the corresponding driving member. The two driving arms or members may, in the broad aspects of the invention, be of any form or construction as long as they are relatively movable toward and from the crankshaft. They may be reciprocable or oscillatable. As a matter of illustration, they are shown as oscillatable members in the accompanying drawings. The compression or rod members are pivotally connected in longitudinally spaced relation to the driving members and at the other ends thereof they are pivotally connected to the crankpins on the corresponding half or end of the crankshaft. All of the compression or rod members have lost motion connections which accommodate movement of the crankpins.

While it is contemplated that any type of lost-motion connections can be used, three specific examples of such connections are here shown by way of illustration. One form of lost-motion connection merely comprises a pin-and-slot connection between the compression member and one of its pins or pivots. Another form of lost-motion connection comprises articulated members arranged in edge-to-edge relation and pivoted at their extremities to the driving member and crank arm. A third form of lost-motion connection comprises telescoping tubular members having limited relative movement and pivoted at their ends to the driving member and crank arm. This connection preferably is also equipped with a compression spring which coacts with the telescoping members to hold them normally extended.

For a more detailed description of the invention reference is had to the accompanying drawings wherein, by way of illustration, the mechanism embodying the instant invention is shown associated with a child's velocipede. As shown in Fig. 1, the frame 20 is equipped with a seat 22 and includes the usual rear fork 24 which carries a transverse axle 26. Rotatably mounted on axle 26 are rear ground-engaging wheels 28, and each wheel is preferably provided with a suitable guard or fender 30 secured to and carried by the frame. At its forward end the frame 20 is provided with a steering fork 32 which has the usual swivel connection therewith and is equipped with conventional handle bars 34. Straddled by the front fork 32 is a ground-engaging power or traction wheel 36 rotatably mounted therein by means hereinafter more fully described.

The above structure is more or less conventional; however, according to the present invention the lower ends of the arms of fork 32 are bent outwardly and upwardly to form U-shaped end portions 38. Ties 40 extending between each portion 38 and the corresponding side of a front fender 42 serve to anchor and steady the lower portions of such fender. The fender 42 is supported at its upper end from the fork 32. As best shown in Fig. 6, the fender side walls are spaced substantially apart to provide ample room at each side of the fork 32 for the driving mechanism embodying the instant invention. Thus, fender 42 not only lends a streamlined appearance to the vehicle, but it also conceals the operating or driving mechanism.

Referring to Fig. 6, it will be noted that the crankshaft comprises a central journal member 44 centrally aligned with the fork 32 in which it is rotatably mounted by suitable antifriction bearings 46. The journal 44 serves as the axle for the wheel 36 which is suitably fixed centrally thereon between the opposite sides of the fork 32. The journal member 44 projects axially outwardly beyond each side of the fork 32 where it has rigidly fixed to each end thereof a radially projecting crank arm 60, the crank arm 60 at one end of the journal member 44 extending in the radially opposite direction from that at the other end of the journal member 44. Each crank arm 60 at its radially outer end has rigidly fixed thereto an axially outwardly directed crankpin 62. The axially outer end of each crankpin 62 has rigidly fixed thereto a relatively short and more or less circumferentially extending arm 64, the opposite end of which is fixed to the axially inner end of the second crankpin 66. The crankpins 66 are preferably disposed at the same radial distance from the axis of rotation of the crankshaft as the corresponding pins 62, and each is angularly offset therefrom about the axis of the crankshaft by a suitable amount, shown in the drawings at 60°. The axially outer end of each crankpin 66 has rigidly fixed thereto a crank arm 68, the opposite end of which has rigidly fixed thereto an axially outwardly directed journal member 70 concentric with the axis of the crankshaft and which is rotatably received in the outer arm of the corresponding U-shaped end 38 of the fork. The crankpins 66 are each angularly offset from the corresponding crankpin 62 in the same direction angularly about the axis of the crankshaft so that it will be appreciated that the crankpins 62 are diametrically opposite each other, and the crankpins 66 are diametrically opposite each other. Thus, each half of the crankshaft is rotatably supported between the opposite legs of the corresponding U-shaped portion 38 of the fork 32, the pins or journals 70 thus serving as outboard bearings for the corresponding ends of the crankshaft.

In the particular embodiment shown by way of illustration the crankshaft is operated by a pair of driving arms 80 which are disposed under the front fender 42 and at opposite sides of fork 32. At their forward ends the driving arms 80 are mounted on horizontal pivots 84, which pivots are carried by a support 88 that is integral with and projects forwardly of fork 32. The rearward ends of the driving arms extend a substantial distance behind fork 32 and carry outwardly projecting pedals 90 which are positioned so that they can be readily reached by the person operating the vehicle.

As suggested, the driving arms 80 are adapted to actuate respective crankpins 62 and 66 of the crankshaft and in such manner that dead-center positions are eliminated during operation of the device. To achieve this end the driving arms 80 are connected to crankpins 62 and 66 by compression or connecting rods 94 and 96 respectively. In order to provide maximum mechanical efficiency, all of the connecting rods should lie in the same plane as their respective crank pins, and this arrangement is achieved by attaching the compression or connecting rods 94 to pivots 98 at the inner sides of the respective driving arms 80 and mounting connecting rods 96 on pivots 100 at the outer sides thereof. As best shown in Figs. 3 and 7, the pairs of compression or connecting rods are attached to their respective driving members 80 in longitudinally spaced relation, and connecting rods 94 are disposed ahead of connecting rods 96. At their upper ends the rear connecting rods 96 are held apart from driving arms 80 by suitable spacers 102, and at their lower ends the connecting rods 96 are held apart from crank arms 64 and crank arms 68 by spacers 104 and 106.

From the foregoing it will be readily apparent that, when the driving arms 80 are rocked or oscillated about pivots 84, the connecting rods 94 and 96 thrust against respective crank-pins to rotate the crankshaft and traction wheel 36. However, each of the compression or connecting rods 94 and 96 must be provided with a lost-motion connection due to their spaced relation on the driving arms 80 and the angular relation between the crank at each end of the crankshaft.

In the case of the forward connecting rods 94 the necessary lost motion is relatively slight and may adequately be provided for by an elongated slot either at the pivots 98 or at the crank pins 62. In the drawings the slots are designated by the numeral 114 and shown at the upper ends of the compression or connecting rods 94 where they receive the pivots 98.

In the case of rear connecting rods 96 the necessary lost motion is relatively great, and provision must be made in substantial separation of connecting rods 96 and pivots 100. Two lost-motion means suitable for use in connection with the rear connecting rods 96 are shown in the drawings. In Figs. 1–11 the rear compression or connecting rods 96 are shown as comprising a pair of articulated triangular sections 122 and 124. The sections 122 and 124 of each pair are positioned in edge-to-edge relation and are pivoted together at one end of their meeting edges as at 126. As suggested, at their distal vertices the sections 122 are pivotally attached to their respective driving arms 80 by pivots 100, and the sections 124 are pivoted on respective crankpins 66. At their edges the sections 122 and 124 are formed with lateral flanges which greatly strengthen them and, in addition, provide relatively broad meeting surfaces which prevent them from slipping laterally past each other when under compression. To further prevent occurrence of this last contingency the meeting flanges are formed with longitudinal ribs 130 and grooves 132 which interfit and positively lock the sections against lateral slippage.

To operate the device the child sits on seat 22 and alternately pushes against the pedals 90 with his feet. This action rocks driving arms 80 about pivots 84. Oscillatory movement of the arms is transmitted to the crankshaft through the connecting rods 94 and 96, and, in transmitting such motion, all of the connecting rods act as compression members. As suggested, the unique arrangement and correlation of the various parts in the mechanism causes the rocking or oscillatory motion of driving arms 80 to be transmitted to the crankshaft in such manner that the latter is rotated continuously in one direction. Moreover, the crankshaft never occupies a dead-center position at the end of the down or power stroke of either driving arm 80.

Since the crank arms 60 are arranged 180° apart, the compression or connecting rods 94 operate in opposition to each other; viz., when one of the connecting rods 94 is on the down stroke, the other connecting rod 94 is on the upstroke. When the connecting rod 94 first referred to reaches the downward limit of its travel, the connecting rod last referred to is at the upward limit of its travel. As suggested, crank arms 64 extend in opposite directions and are preferably disposed at an angle of substantially 60° relative to the crank arms 60 in order to obtain maximum mechanical efficiency. Thus the proximate crank arm 64 is disposed 60° behind its respective crank arm 60, and the remote crank arm 60 is disposed 60° in front of its respective crank arm 60, as viewed in Fig. 3.

By reason of this unique construction and arrangement of parts, thrust is applied against the crankshaft by the forward connecting rods 94 during the initial downward movement of driving arms 80, and the final thrust against the crankshaft is applied through the rear connecting rods 96. Thus, on its down stroke, each of the arms 80 drives the crankshaft through 180° from a position approximately 30° past top dead center to a position approximately 30° past bottom dead center. In this connection it is to be noted that the specific angles referred to apply to the particular arrangement shown in the drawing, and that if the angular relation between the respective crank arms 60 and 64 or the respective compression or connecting members 94 and 96 are changed, the specific data given above will vary accordingly.

Reference is now had to Figs. 9, 10, and 11 which show diagrammatically the manner in which power is transmitted from one of the driving arms 80 to rotate the crankshaft through 180°. In Fig. 9 the driving arm 80 is shown at the upper limits of its travel, pivot 98 is at the upper end of slot 114, sections 122 and 124 are separated, crank arm 60 is approximately 30° past and crank arm 64 is approximately 30° ahead of top dead center. As driving arm 80 begins its down or power stroke, pivot 98 moves to the lower limit of slot 114 and applies pressure downwardly against the crankpin 62 through the medium of the compression or connecting rod 94. Force is transmitted through the forward connecting rod 94 until the meeting edges of the triangular sections 122 and 124 come together, at which time pressure is applied against the crankshaft through the medium of the rear compression or connecting rod 96.

Fig. 10 shows the positions of the parts at the time the triangular sections 122 and 124 come together. It will be observed that the crank arm 64 is a substantial distance past top dead center and in a position to transmit maximum thrust to the crankshaft. Force continues to be transmitted to the crankshaft through the rear compression member 96 until the driving arm 80 reaches the lower limit of its travel. At this time the parts have assumed the positions shown in Fig. 11. It will be observed that pin 98 has again moved to the upper limit of slot 114 to allow crank arm 60 to move past bottom dead center and that this crank arm now occupies a position substantially 30° past center.

Since the crank arm 60 shown in Figs. 9–11 is approximately 30° past bottom dead center, the opposite crank arm 60 is an equal distance past top dead center. Also, the driving arm 80 attached to the last-mentioned crank arm 60 is at the upper limit of its travel and ready to begin its downward or compression stroke. The above series of operations is then repeated during the down stroke of arm 80 above referred to.

Fig. 12 shows a modified form of the invention which is identical to the form hereinabove described, except for the compression or connecting rods. In this form of the invention the front compression member is designated by the numeral 140 and the rear compression member by the numeral 142. While one driving arm 80 only is shown in the drawing, it is to be understood that the mechanism includes the second driving arm 80 and that the latter is equipped with connecting rods which are identical to those shown. Front compression member 140 comprises generally vertically arranged, telescoping tubes 144 and 146. At its upper end, tube 144 is pivotally attached to a clevis 148 carried by driving arm 80, and at its lower end tube 146 is screwed onto a stud 150 carried by a pivot block 152 which is mounted for pivotal movement on crank pin 62. Confined within tubes 144 and 146 is a compression spring 154 which holds the same normally separated. Lost motion is provided by relative sliding movement of tubes 144 and 146. During the down or compression stroke of driving arm 80, tube 144 slides downwardly on tube 146 against the action of spring 154 and seats against a shoulder 156 on stud 150 to transmit downward pressure from the driving arm to crank pin 62.

The rear connecting rod or compression member 142 merely comprises a rigid rodlike member 158. At its upper end the rod 158 carries a fitting 160 which has an elongated slot 162, and this fitting is embraced by a clevis 164 which is mounted on the under side of driving arm 80. A pivot 166 extends transversely between the arms of clevis 164 and through slot 162 to pivotally connect rod 142 to driving arm 80. At its lower end, rod 158 is provided with a pivot block 168 which is mounted for pivotal or oscillatory movement on crank pin 66. Lost motion is provided by movement of pivot 166 in slot 162. When pivot 166 is at the lower end of slot 162, as shown in the drawing, pressure is transmitted from driving arm 80 to the crankshaft through the rear compression member 142.

The operation of the modified form of the invention is identical to the operation of the form first described.

It is to be understood that the forms of the invention herewith shown and described are to be taken as preferred examples of the same and that various changes in the size, shape, and arrangement of parts may be resorted to without departing from the spirit of the invention or the scope of the appended claims.

Having thus described the invention, I claim:

1. In a device of the character described, a rotatable crankshaft having at least two pairs of crankpins and the crankpins of each pair disposed in angularly spaced relation with respect to the axis of rotation; a driven member fixed on the crankshaft; a separate compression member pivotally attached to each of said crankpins; a pair of drive members mounted for movement relative to the crankshaft and pivotally connected to respective pairs of compression members, each pair of compression members being connected in spaced relation to its respective driving member; and a lost-motion connection for each of said compression members, whereby movement of said driving members effects continuous rotation of the crankshaft in one direction.

2. In a device of the character described, a rotatable crankshaft having at least two pairs of crankpins and the crankpins of each pair disposed in angularly spaced relation with respect to the axis of rotation; a driven member fixed on the crankshaft; a drive means for each pair of crankpins, said means having fixed pivots, pivoted arms mounted on said fixed pivots for movement relative to the crankshaft, and compression members connecting the arms with their respective crankpins, said compression members being connected at spaced points along the arms and having lost-motion connections whereby movement of said arms effects continuous rotation of the crankshaft in one direction.

3. The combination as set forth in claim 2 in which the crankpins of each pair are spaced substantially 60° apart.

4. In a foot pedaled device, rotatable crankshaft having at least two pairs of crankpins and the crankpins of each pair disposed in angularly spaced relation with respect to the axis of rotation; a driven member fixed on the shaft between said pairs of crankpins; a pair of fixed pivots; a driving arm for each pair of crankpins each arm mounted on a respective one of said fixed pivots and movable relative to said crankshaft; foot pedals on said driving arms; and a pair of compression members connecting each driving arm to its respective crankpins, each of said compression members having a lost-motion connection whereby movement of said driving arms effects continuous rotation of the crankshaft in one direction.

5. In a foot pedaled device, a crankshaft having at least two pairs of crankpins and the crankpins of each pair disposed in angularly spaced relation with respect to the axis of rotation; a driven member fixed on the shaft between said pairs of crankpins; a driving arm for each pair of crankpins mounted for movement relative to the crankshaft; foot pedals on said driving arms; and a pair of compression members connecting each driving arm to its respective pair of crankpins, one compression member of each pair comprising a pivoted link having a pin and slot connection at one end thereof and the other of said compression members comprising articulated sections disposed in edge-to-edge relation and pivotally connected to respective driving arms and crankpins.

6. In a device of the character described, a rotatable crankshaft having at least two pairs of crankpins and the crankpins of each pair disposed in angularly spaced relation with respect to the axis of rotation; a driven member fixed on the crankshaft between the pairs of crankpins; a pair of fixed pivots a driving arm for each pair of crankpins each of said driving arms mounted on a respective one of said fixed pivots and movable relative to the crankshaft; and a pair of compression members connecting each driving arm to its respective crankpins, one of said compression members comprising a pivoted link having a pin and slot connection at one end thereof and the other of said compression members comprising telescoping sections having limited sliding movement relative to each other.

7. In a device of the character described, a rotatable crankshaft having at least two pairs of crankpins and the crankpins of each pair disposed in angularly spaced relation with respect to the axis of rotation; a driven member fixed on the crankshaft between the pairs of crankpins; a pair of fixed pivots a driving arm for each pair of crankpins each of said driving arms mounted on a respective one of said fixed pivots and movable relative to the crankshaft; a pair of compression members connecting each driving arm to its respective crankpins, one of said compression members comprising a pivoted link having a pin and slot connection at one end thereof and the other of said compression members comprising telescoping sections having limited sliding movement relative to each other; and a compression spring co-active with said telescoping sections to hold the same normally extended.

8. In a device of the character described, a crankshaft having at least two pairs of crankpins and the crankpins of each pair disposed in angularly spaced relation with respect to the axis of rotation; a pair of fixed pivots a driving arm for each pair of crankpins each of said driving arms mounted on a respective one of said fixed pivots and movable relative to the crankshaft; a pair of compression members connecting each of the driving arms with its respective crankpins; and lost-motion means associated with said compression members, the arrangement being such that the compression members transmit movement of the driving arms into rotary movement of the crankshaft.

9. In combination, a pair of fixed pivots, a driving element on each of said pivots; a crankshaft having a pair of crankpins for each of said driving elements and the crankpins of each pair disposed in angularly spaced relation with respect to the axis of rotation; pivoted compression members connecting the driving elements to their respective crankpins; and lost-motion means associated with each of the compression members.

10. In combination, a pair of fixed pivots, a driving element on each of said pivots; a rotatable crankshaft having a pair of crankpins for each of said driving elements and the crankpins of each pair disposed in angularly spaced relation with respect to the axis of rotation; a pair of compression members connecting each driving element with its respective crankpins, the compression members of each pair pivoted at one end in longitudinally spaced relation to their respective driving arms and at the other end thereof to the crankpins; and lost-motion means associated with each of said compression members.

11. In combination, a rotatable crankshaft having at least two pairs of crankpins and the crankpins of each pair disposed in angularly spaced relation with respect to the axis of rotation; a separate compression member pivoted on each of said crankpins; lost-motion means associated with each of said compression members; fixed pivots; and separate means carried by said fixed pivots for applying pressure simultaneously against the compression members associated with each pair of crankpins.

12. In combination, a pair of fixed pivots, a drive member on each of said pivots; a rotatable crankshaft having a pair of crankpins for each of the driving members and the crankpins of each pair disposed in angularly spaced relation with respect to the axis of rotation; pivoted compression members connecting each of the driving elements with its respective pair of crankpins; at least one of said compression members having a pin and slot connection and all of said compression members having lost-motion connections.

13. In combination, a pair of drive members; a crankshaft having a pair of crankpins for each of the driving members and the crankpins of each pair disposed in angularly spaced relation with respect to the axis of rotation; and a pair of pivoted compression members connecting each of the driving members with its respective pair of crankpins, at least one of said compression members comprising articulated triangular sections arranged in edge-to-edge relation and pivotally connected to its respective driving member and crankpin and all of said compression members having lost-motion connections.

14. In combination, a pair of fixed pivots, a driving element on each of said pivots; a crankshaft having a pair of crankpins for each of said driving elements and the crankpins of each pair disposed in angularly spaced relation with respect to the axis of rotation; and a pair of pivoted compression members connecting each of the driving elements with its respective pair of crankpins, at least one of said compression members comprising telescoping sections which have limited sliding movement relative to each other and all of said compression members having lost-motion connections.

15. In a device of the character described, a rotatable crankshaft having at least two pairs of crank pins and the crank pins of each pair disposed in angularly spaced relation with respect to the axis of rotation; a driven member fixed on the crankshaft; a pair of drive members mounted for movement relative to the crankshaft; and force-exerting means interconnecting each pair of crank pins with respective drive members, each means including a pair of compression members pivoted to respective crank pins and to the drive member and lost motion means permitting relative movement between the drive member and said crank pins.

JACK J. SENDOYKAS.

REFERENCES CITED

The following references are of record in the file of this patent:

UNITED STATES PATENTS

| Number | Name | Date |
| --- | --- | --- |
| 68,482 | Bicknell | Sept. 3, 1867 |
| 115,073 | Lull | May 23, 1871 |
| 589,353 | Jensen | Aug. 31, 1897 |